July 12, 1927.
W. SCHMIDT
1,635,561
STEAM POWER PLANT FOR SUBMARINES
Filed May 11, 1922
2 Sheets-Sheet 1
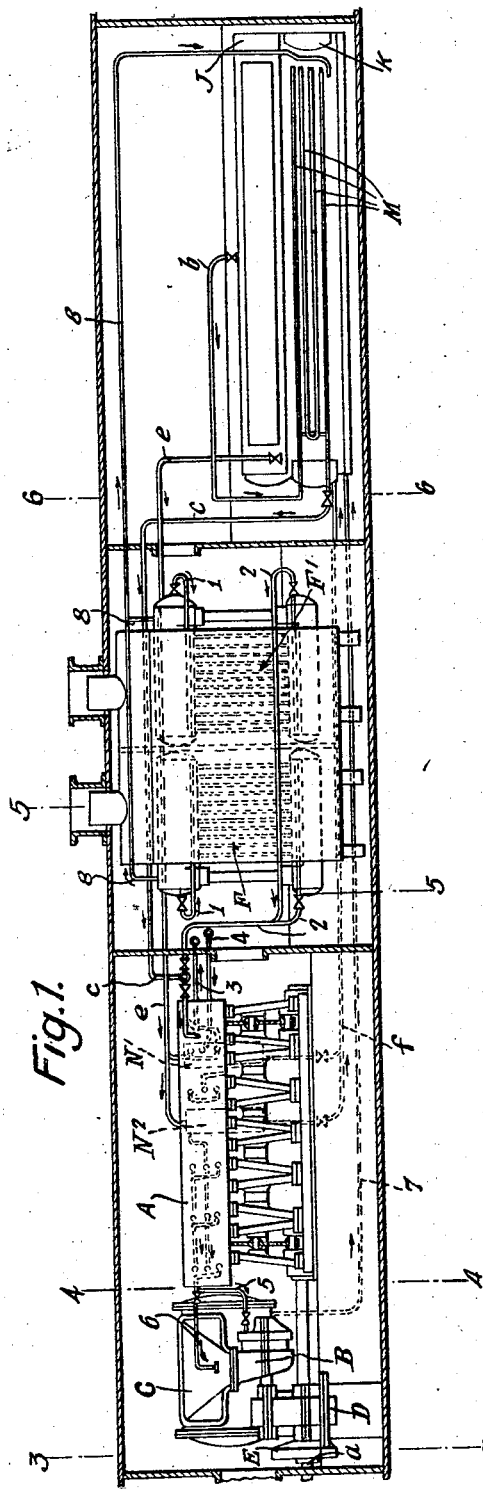
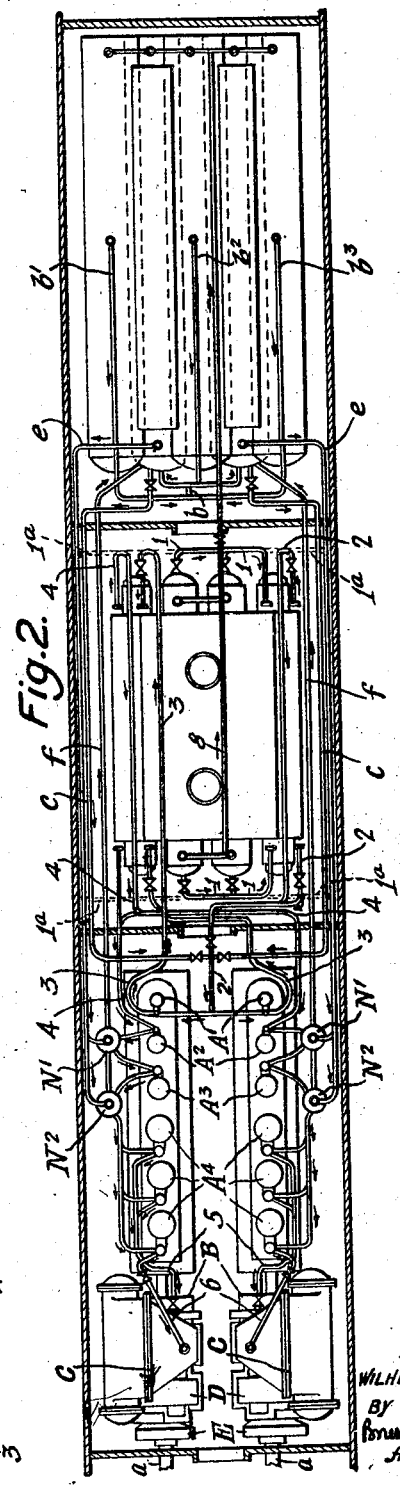
Inventor:
WILHELM SCHMIDT
By
Attorneys July 12, 1927.  W. SCHMIDT  1,635,561

STEAM POWER PLANT FOR SUBMARINES

Filed May 11, 1922   2 Sheets-Sheet 2

Inventor:
WILHELM SCHMIDT
BY
Attorneys

Patented July 12, 1927.

1,635,561

UNITED STATES PATENT OFFICE.

WILHELM SCHMIDT, OF CASSEL-WILHELMSHOHE, GERMANY; SIMON HOFFMANN, OF CASSEL-WILHELMSHOHE, GERMANY, EXECUTOR OF WILHELM SCHMIDT, DECEASED, ASSIGNOR TO SCHMIDT'SCHE HEISSDAMPF G. M. B. H., OF CASSEL-WILHELMSHOHE, GERMANY, A CORPORATION OF GERMANY.

STEAM-POWER PLANT FOR SUBMARINES.

Application filed May 11, 1922, Serial No. 560,019, and in Germany May 23, 1921.

My present invention relates to steam power plants for submarines. More particularly, to a method of operating such plants. More particularly, I have sought to improve the construction and operation of that type of power plant for submarines which comprises a steam engine, a steam generator, and a heat accumulator which stores heat while the boat is traveling on the surface, and gives off the stored heat when the submarine is running submerged. Power plants of this type, as constructed and operated hitherto, are very uneconomical at the low horse powers used in submerged navigation.

The object of my invention is to provide improvements which will materially increase the efficiency of power plants of the type mentioned above, and which will reduce the weight of the plant and the space required for it.

To this end, I have devised a novel arrangement and operation for the more efficient utilization of the heat stored in the accumulator. The engine used in connection with my invention comprises a plurality of elements or stages in which the steam expands successively while performing work, and such steam is superheated at some intermediate point, that is to say, on its way from one stage to another. According to my invention, such superheating is effected, during submerged running, by heat stored in the accumulator; and the major portion or all of the heat stored for superheating purposes is utilized for such intermediate superheating. By this novel arrangement and operation, I obtain the advantages referred to above.

The invention also consists in certain other features which will be pointed out hereinafter.

In the accompanying drawings I have shown, as an example, a steam power plant operating according to my present invention.

Figure 3:
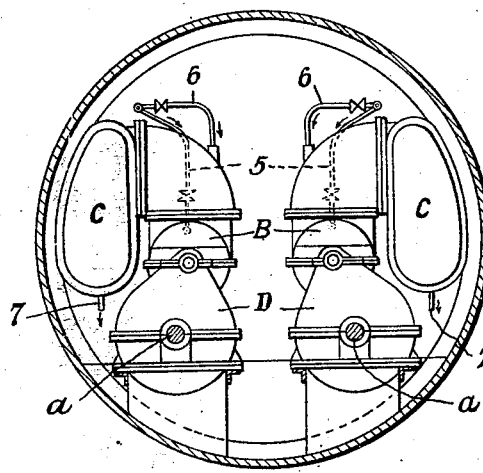
Figure 4:
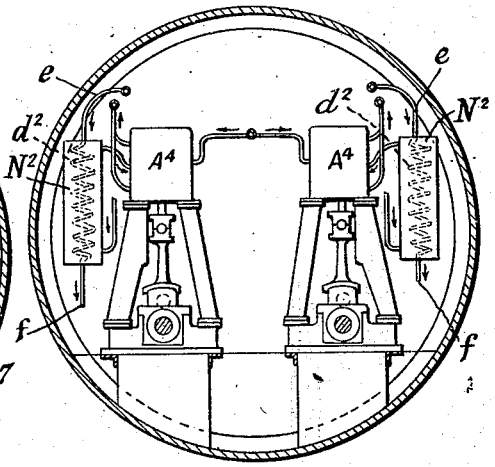
Figure 5:
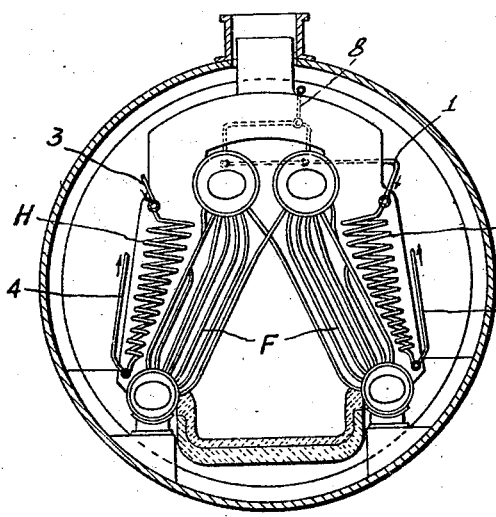
Figure 6:
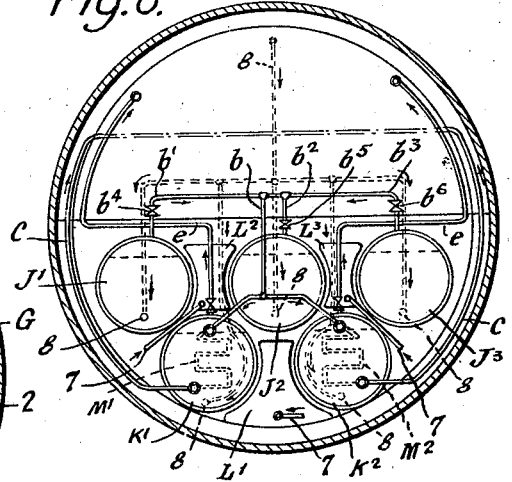

Figure 1 is a longitudinal section through such plant showing the same diagrammatically in connection with a portion of a submarine having two propeller shafts. Figure 2 is a corresponding plan view; Figs. 3, 4, 5 and 6 are cross sections on the correspondingly numbered lines of Fig. 1.

At A I have indicated two quadruple expansion six cylinder steam engines of the reciprocating type, each engine having a high pressure cylinder $A^1$, a first intermediate pressure cylinder $A^2$, a second intermediate pressure cylinder $A^3$, and three low pressure cylinders $A^4$, the crank shafts of said engines being connected directly with the respective propeller shafts $a$. At B I have indicated low pressure turbines with condensers C which turbines, in the case of greater power being required as for high speed, may be coupled with the propeller shafts, for instance, by means of tooth gearing D and friction clutches E (of any well known or approved construction) which permit these turbines to be thrown into or out of connection with the propeller shafts.

F F' is a double boiler of the water tube type provided with live steam superheaters G and with intermediate steam superheaters H.

For the storage of heat I provide the hot water heat-accumulating receptacles $J^1$, $J^2$, $J^3$, $K^1$ and $K^2$; the water contained in these receptacles is heated for instance to 275° by high pressure steam generated in the boiler while the submarine is traveling on the surface. This steam may, for instance, pass from the boiler first through pipes 1 to the inlets of the coils of the superheaters G in which such live steam is superheated by the heat of the combustion gases. From the outlets of these coils, the superheated live steam passes through pipes 2 to the high pressure cylinders $A'$ of the multiple expansion engines A. From these cylinders $A'$, the exhaust steam is conveyed by pipes 3 to the coils of the intermediate steam superheaters H, heated by the combustion gases. The exhaust steam thus superheated is then led through pipes 4 to the first intermediate pressure cylinders $A^2$, where it performs work, to pass thereupon through the cylinders $A^3$ and $A^4$, in a manner that will be obvious to a person skilled in the art. The exhaust from the low pressure cylinders is generally conveyed (while the submarine is traveling on the surface) to the low pressure turbines B, for instance through pipes 5, so as to utilize the motive power of the steam more efficiently. The exhaust from the turbines passes to the condensers C, and from the latter the water of condensation is conveyed by pipes 7 to the feed water receptacles $L^1$, $L^2$, $L^3$ referred to below. During surface travel of the submarine, high-pressure live steam (of 60 atmospheres or over) passes from the steam space of the boiler F, F' to the lower portions of the heat-accumulating receptacles J', $J^2$, $J^3$, $K^1$, and $K^2$, for instance by means of pipes such as indicated at 8 in Figs. 1, 5 and 6. With live steam of 60 atmospheres, the contents of said receptacles may be heated to about 275° centigrade. When traveling submerged the reciprocating steam engines A will generally operate alone, that is, without the low pressure turbines B. In this case the reciprocating steam engines will send their exhaust direct to the condensers C through pipes 6. These engines take their working steam from the heat accumulators; at the beginning it is preferable to use the motive power of the steam stored in the boiler and in the superheaters. After this steam has been exhausted, under water travel is continued by taking steam from the receptacles $J^1$, $J^2$, $J^3$, through pipes $b^1$, $b^2$, $b^3$, provided with valves $b^4$, $b^5$ $b^6$ respectively, and through a pipe $b$, which is connected with each of said pipes $b^1$, $b^2$, $b^3$ and leads to the engines, throttling this steam down, for instance to 10 atmospheres and passing it through the pipes $b^1$ and $b$ into heating coils $M^1$, $M^2$, situated within the receptacles $K^1$, $K^2$. There the steam becomes superheated in accordance with the temperature of the heating medium and is then conveyed to the reciprocating steam engines A through the conduits $c$. Thus, at the beginning, only superheating heat will be taken from the receptacles $K^1$, $K^2$, and only after the other accumulating receptacles have been utilized fully, the receptacles $K^1$, $K^2$, will be called upon to supply heat for generating steam. Since only a small degree of superheating is attainable for the live steam, the greater portion of the heat accumulated will be employed for the superheating of intermediate steam. The receivers $N^1$ and $N^2$ located adjacent to the engines A are constructed as intermediate superheaters for the two lower stages; for instance, these receivers may contain heating coils $d^2$, $d^2$ heated by means of accumulator steam taken from the receptacles $K^1$, $K^2$, through narrow pipes or conduits $e$, while the steam coming from the first intermediate pressure cylinders $A^2$ and from the second intermediate pressure cylinders $A^3$ would pass around said pipes $e$, through the receivers $N^1$ and $N^2$ respectively. Preferably, the intermediate superheaters $N^1$, $N^2$, are located at such a high level that the condensation product formed during the intermediate superheating will automatically flow back to the accumulator receptacles through conduits $f$. With low powers the flow of the condensation product will result merely from the difference in level between the intermediate superheaters located at a relatively high level and the receptacles $K^1$, $K^2$ giving off the superheating steam and located at a relatively low level. With high powers, however, the condensation product must be conveyed by mechanical devices to the receptacles $J^1$, $J^2$, $J^3$ giving off the working steam, in which the pressure has been somewhat reduced. The difference in pressures occurring in this case enables the intermediate superheaters to be heated more strongly. Furthermore, the heat contained in the liquid condensation product is rendered available for the further generation of steam. The intermediate superheaters would, in this case, preferably be heated by means of a liquid having a high boiling point. It is true that this would require special circulating pumps which are not necessary when steam heating is employed. As long as the receptacles $J^1$, $J^2$, $J^3$ are able to supply steam for operating the engines, the heat stored in the receivers $K^1$, $K^2$ is used only for superheating such steam. When the temperature of the contents of these receivers has dropped to a point at which it is insufficient for a material or serviceable superheating of such steam, or when the steam supply stored in the receptacles $J^1$, $J^2$, $J^3$ has been exhausted, heat for generating steam is taken from said receivers $K^1$, $K^2$. For this purpose, the conduits $b$ are shut off, and the steam from the pipes $e$ is not conveyed to the intermediate superheaters $N^1$, $N^2$, but directly to the high-pressure cylinders $A^1$; this may be effected through pipes branched off from the conduits $e$ and leading to the pipe 2.

At $L^1$, $L^2$, $L^3$, I have indicated feed water receptacles into which the condensation product from the condensers is conveyed the location of these receptacles in the spaces between the heat-accumulating receptacles, at the lower part of the boat, being of especial advantage during submerged travel of the submarine in order to avoid any change in the equilibrium or level position of the boat. From the receptacles $L^1$, $L^2$, $L^3$, the heated feed water is conveyed to the boiler in any well-known or approved manner.

The method described above, of utilizing the accumulated heat for under surface travel, also offers great advantages for surface travel. In the latter case, contrary to what is done for submerged travel, the high pressure steam produced in the boiler is, for the purpose of the fullest possible utilization of the heat, caused to operate in the steam engine without any throttling, since in this case, the steam may be superheated twice by furnace gases, and thus receive sufficient superheat for the two upper stages of for instance a quadruple expansion engine.

When employing a high live steam pressure of for instance 60 atmospheres, and a considerable degree of expansion into a vacuum, the two lowermost stages, or at least the last stage would lack the superheat required to prevent condensation on the walls of the engine, then, the devices for superheating the intermediate steam, which are intended for submerged travel, are preferably also used during surface travel. For this purpose, the steam exhausting from the first intermediate pressure cylinders $A^2$ is passed to the receivers $N^1$, to be there superheated in the manner set forth above, and the steam on its way from the second intermediate cylinders $A^3$ to the low pressure cylinders $A^4$ is passed through the receivers $N^2$, to be superheated in them. The steam for heating the coils $d^2$, $d^2$ of these receivers or superheaters is taken from the heat storing receivers $K^1$ $K^2$ through the conduits $e$.

The devices employed for the efficient utilization of the stored heat during submerged travel also improve the fuel consumption of the steam engine so considerably for short surface voyages, that such efficiency becomes equal to that of an oil engine operating under a moderate load. With the unit steam power plant explained above, it is therefore possible, even without an oil engine, to obtain about the same radius of action for surface travel as with the oil-electric drive hitherto employed for submarines.

Various modifications may be made without departing from the spirit and scope of my invention.

I claim:

1. A power plant for submarines, comprising a multiple stage steam engine, a receiver connected with successive stages of said engine so that steam will pass through said receiver on its way from one stage to a lower pressure stage, a storage receptacle having connections to receive live steam during surface travel of the submarine, and to supply steam to the engine during submerged travel, another storage receptacle having a connection to store heat during surface travel, a heating coil located within said receiver and having a connection to receive stored heat from said second-named receptacle, during submerged travel, and thereby superheat the steam which passes through said receiver on its way from one stage to another, and a conduit for conveying the condensation product from said coil to the lower portion of the first-named receptacle.

2. A power plant for driving submerged submarines comprising a steam engine having a plurality of stages, a heat accumulator consisting of two parts each containing hot water of a pressure of at least 30 atmospheres, the water in one of said parts serving to produce steam while the water in the other accumulator part serves to superheat the steam which is about to be admitted to the intermediate and lower stages of the engine.

3. A power plant for submarines, comprising a steam generator, a multiple stage steam engine, a connection for conveying steam from said generator to the highest stage of said engine, a heat accumulator, a connection for conveying steam from said generator to said accumulator, a connection for conveying steam from said accumulator to the highest stage of said engine, a superheater interposed between two stages of said engine, and a connection for conveying steam from said accumulator to said superheater to superheat the steam which is on its way from one stage of said engine to the next.

WILHELM SCHMIDT.